L. BRADFORD.
PROCESS FOR THE SEPARATION OF METALLIC SULFIDS FROM GANGUE AND APPARATUS THEREFOR.
APPLICATION FILED MAR. 11, 1912.
1,101,506.
Patented June 23, 1914.
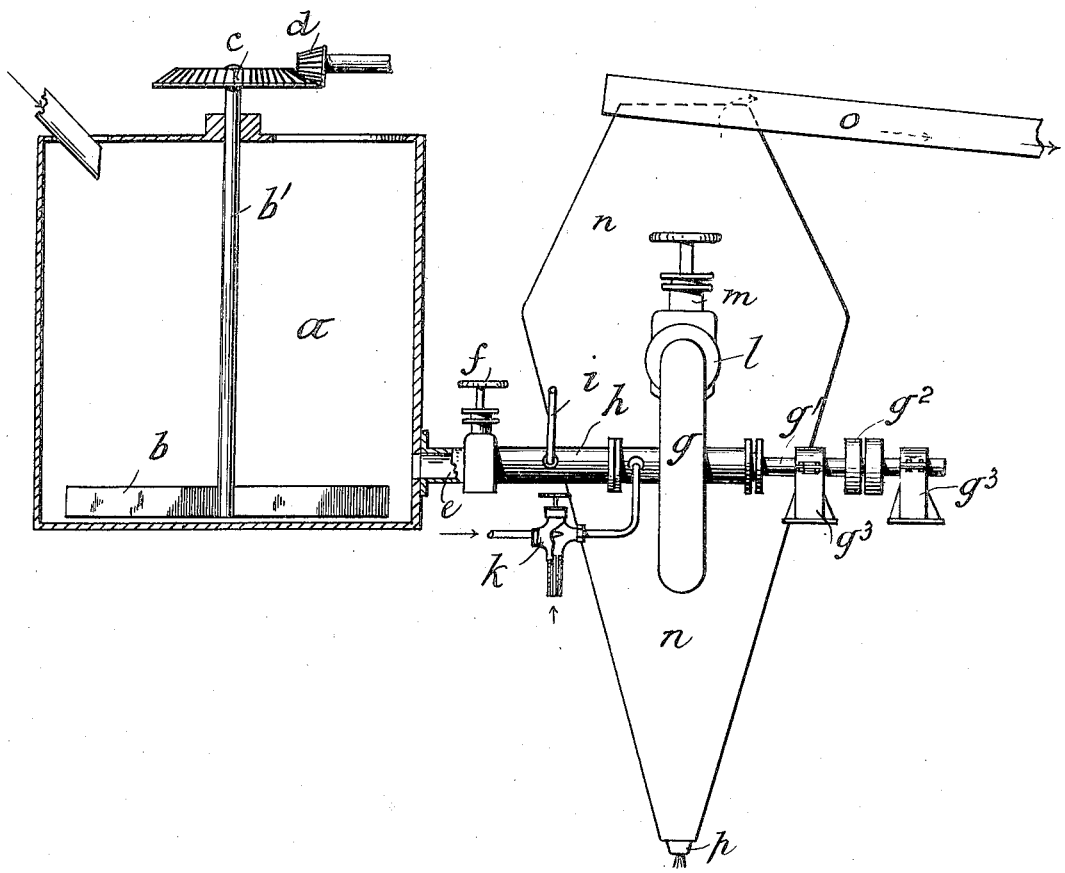

UNITED STATES PATENT OFFICE.

LESLIE BRADFORD, OF BROKEN HILL, NEW SOUTH WALES, AUSTRALIA, ASSIGNOR, BY MESNE ASSIGNMENTS, TO MINERALS SEPARATION LIMITED, OF LONDON, ENGLAND.

PROCESS FOR THE SEPARATION OF METALLIC SULFIDS FROM GANGUE AND APPARATUS THEREFOR.

1,101,506.

Specification of Letters Patent. Patented June 23, 1914.

Application filed March 11, 1912. Serial No. 683,005.

*To all whom it may concern:*

Be it known that I, LESLIE BRADFORD, a subject of the King of Great Britain, residing at Broken Hill, in New South Wales, Australia, have invented an Improved Process for the Separation of Metallic Sulfids from Gangue and Apparatus Therefor, of which the following is a specification, reference being had therein to the accompanying drawing.

This invention has been devised to provide an economical and efficient process of treating metallic sulfids so as to separate them from the gangue stuff in which they are embraced and the invention also includes a combination of mechanical means to carry such treatment into effect. It is well known that sulfids can be recovered from ores by several means, notably—by immersion in hot acidulated solution, when the sulfid particles become gas logged and float: by coating the sulfid particles with oil and subjecting the oiled particles partially gassed to a vacuum, by which means the gas films expand and float the oiled particles: by cleaning thoroughly the sulfid particles and then floating same by filming on the surface of water: by vigorously agitating the ore with acid and a very small proportion of oil, or other frothing agent or agents, and air, and subsequently floating the sulfid in a spitzkasten. Numerous other methods have also from time to time been proposed to bring about a recovery of sulfids from gangue by means of flotation. Most of these methods fail when the ore is slimed, or is in a fine state of division. Heretofore, it has been generally accepted that the only processes which are effective on this class of material are those in which vigorous agitation is resorted to, the essentials of such processes being the addition of oils or other organic "frothing agents" in varying proportions and admixtures, and the vigorous beating in by mechanical means of air, so that the ore, frothing agent, air and solution form an "emulsion" which when allowed to repose in a quiescent condition results in a separation, the sulfid particles, frothing agent, and included air bubbles (together with any gas evolved by the action of the acid on the ore) floating to the top by reason of their aversion to become wetted, the lower specific gravity of the mass, surface tension, and other various effects, while the gangue being thoroughly wetted is inert and sinks to the bottom. Moreover—so far as I am aware in all these frothing processes great stress is laid on the beating in of air and the use of an organic frothing agent. The nature and composition of the particular kind or kinds of frothing agents used have formed the subject matter of numerous patents. I have found that under certain conditions, flotation of the sulfids can be successfully produced by the use of a dilute hot solution of sulfuric acid without the use of any frothing agent, and that it is not absolutely essential to beat in any extraneous air, the gas generated by the action of the acid on the ore, if properly utilized, being quite sufficient to effect a good float. The admission of air and steam undoubtedly assist in the flotation, and I therefore do not limit myself to operating with or without air or with or without steam. Furthermore—I have found that it is not necessary to employ heat to the same extent as is usually adopted in the straight out acid flotation process. The degree to which the solution is heated prior to use is largely dependent on the nature of ore to be treated. A temperature of 140° F. has been found to be quite sufficient for most ores, although a lower degree of heat can be employed, and if the separation is not complete, the operation can be repeated. With other ores, temperatures very much lower than this have been found quite sufficient, while in some extreme cases solutions at ordinary atmospheric temperatures will yield good results, and I therefore do not limit myself to any particular degree of heat.

The main feature of my invention consists in the flotation of the sulfids in ores by means of an acidulated solution, by vigorous agitation with or without the introduction of air and with or without the introduction of steam in an inclosed aerating or gasifying apparatus (such as a throttled centrifugal pump). By these means I am enabled to dispense with the addition of any extraneous frothing agents such as the mineral or essential oils, the fatty acids, the phenols, aromatic acids, or resinous substances, the alcohols, ethers or vegetable acids, petroleum, tarry products, etc., the employment of such substances not being essential for the recovery of sulfids when my invention is employed. Various forms of inclosed agitating apparatus may be employed for the carrying out of the process.

In the accompanying drawing is shown a side elevation partly in section of a plant which I find effective. Referring thereto $a$ is a mixer tank or box provided with a paddle $b$ and means such as bevel gearing $c$ and $d$ for slowly revolving the shaft $b'$ so the contents of the tank $a$ will be mixed into the condition of a freely flowing pulp. Into this tank or box $a$ the pulverized ore and feebly acidulated solution are delivered. Near the bottom of the said mixer box $a$ is fixed an exit pipe $e$ with a valve $f$ to regulate the flow of the pulp to a throttled centrifugal pump $g$ which in this case is used as the inclosed agitator. The runner shaft $g'$ of the pump $g$ may be driven by the pulley $g^2$ and supported in bearings $g^3$.

The intake pipe $h$ to the pump has a small pipe $i$ fixed in it for the addition of sulfuric acid in any required quantity. A steam air injector $k$ is tapped into the barrel of the pump $g$ for the dual purpose of heating the acidulated ore pulp, and for the introduction of air if found necessary.

The exit pipe $l$ from the centrifugal pump is provided with a valve $m$ for throttling the delivery of the pulp. The effect of the throttling of the outlet of the centrifugal pump $g$ by the valve $m$ is to cause the pulp to be thoroughly churned and agitated, thereby causing effective gasification and aeration of the metallic sulfid particles for their subsequent flotation. The thoroughly gassed pulp is delivered by the pump $g$ into a spitzkasten $n$, where the separation takes place: the sulfids float to the top, by reason of the buoyancy of attached gas or air, and are allowed to flow away as concentrates by chute $o$ while the residues sink to the bottom and escape through a continuously running plug hole $p$. It will be readily understood that the requisite quantity of acid can be delivered by gravitation or otherwise into the intake pipe $h$ to effect the reaction needed in the process and also that the steam and air entering in adjustable quantities will respectively heat and aerate the pulpy mixture to assist the separation aimed at. In operation the centrifugal pump fulfils the dual function of churning and delivering the pulpy mixture, the stop valves being so adjusted that the throttling by the valve $m$ will cause the pulpy liquid to be frothed or aerated by the runner of the pump. The evolution of gas within the pump chamber or the introduction of air or other gas into the pump chamber, assures the presence in the pulp while it is being agitated by the runner of the pump of the necessary air or other gas for the aeration or gasification of the pulp.

Having now described my invention, what I claim as new and desire to secure by Letters Patent is:—

1. A process of concentrating ores, which consists in mixing the ore with water to form a flowing pulp, adding to the pulp sufficient acid to bring about the evolution of gas by chemical action of the acid, subjecting the pulp and evolved gas therein to violent agitation, and then flowing the agitated pulp away from the place of agitation and separating the floating material.

2. A process of concentrating ores, which consists in mixing the ore with water to form a flowing pulp, adding to the pulp sufficient acid to bring about the evolution of gas by chemical action of the acid and also introducing air into the pulp, subjecting the pulp and evolved gas and air therein to violent agitation and then flowing the agitated pulp away from the place of agitation and separating the floating material.

3. A process of concentrating ores, which consists in mixing the ore with slightly acidulated water to form a flowing pulp, adding to the pulp a further quantity of acid to bring about the evolution of gas by chemical action of the acid, subjecting the pulp and evolved gas therein to violent agitation, and then flowing the agitated pulp away from the place of agitation and separating the floating material.

4. A process of concentrating ores, which consists in mixing the ore with slightly acidulated water to form a flowing pulp, heating the pulp and adding to it a further quantity of acid to bring about the evolution of gas by chemical action of the acid, subjecting the pulp and evolved gas therein to violent agitation, and then flowing the agitated pulp away from the place of agitation and separating the floating material.

5. A process of concentrating ores, which consists in mixing the ore with slightly acidulated water to form a flowing pulp, heating the pulp and adding to it a further quantity of acid to bring about the evolution of gas by chemical action of the acid and also introducing air into the pulp, subjecting the pulp and evolved gas and air therein to violent agitation, and then flowing the agitated pulp away from the place of agitation and separating the floating material.

6. A process of concentrating ores, which consists in mixing the ore with slightly acidulated water to form a flowing pulp, adding to the pulp a further quantity of acid to bring about the evolution of gas by chemical action of the acid, introducing air and steam into the pulp, subjecting the heated pulp and evolved gas and air therein to violent agitation, and then flowing the agitated pulp away from the place of agitation and separating the floating material.

7. In an ore separating apparatus, a combined pulp agitator and pulp pump having a closed combined agitating and pump chamber, means for supplying an ore pulp and a gas to the closed chamber, and means for conducting away the agitated pulp from the closed chamber.

8. In an ore separating apparatus, a combined pulp agitator and pulp pump having a closed combined agitating and pump chamber, means for supplying an ore pulp to the closed chamber, and means for retarding the movement of the pulp through the closed chamber in opposition to the propulsive force of the pump to effect thorough agitation of the pulp within the pump.

9. An ore separating apparatus comprising, in combination, a combined pulp agitator and pulp pump having a closed combined agitating and pump chamber, means for supplying an ore pulp and a gas to the closed chamber, and a separating vessel directly connected to the closed chamber for receiving the agitated pulp therefrom.

10. In an ore separating apparatus, a centrifugal device constituting a combined pulp agitator and pulp pump and having a closed combined agitating and pump chamber, means for supplying an ore pulp and a gas to the closed chamber, and means for conducting away the agitated pulp from the closed chamber.

11. An ore separating apparatus comprising a centrifugal device constituting a combined pulp agitator and pulp pump and having a closed combined agitating and pump chamber, means for supplying an ore pulp and a gas to the closed chamber and an outlet therefrom, and an adjustable throttle for the outlet to retard delivery of the pulp from the closed chamber in opposition to the propulsive force of the pump.

12. An ore separating apparatus comprising, in combination, a centrifugal device constituting a combined pulp agitator and pulp pump including a closed combined agitating and pump chamber, means for supplying an ore pulp and a gas to the closed chamber, a separating vessel directly connected with such chamber for receiving the agitated pulp therefrom, and an adjustable throttle interposed in such connection.

13. A process of concentrating ores which consists in mixing the ore with water to form a flowing pulp, flowing the pulp into a closed vessel and subjecting it therein to violent agitation in the presence of a gas, flowing the agitated pulp away from the place of agitation and directly into a body of liquid with continuation of the inclosure thereof until the pulp is delivered into the body of liquid, the pulp being delivered into the body of liquid below the liquid level and the body of liquid being in a substantially quiescent condition so that the gas in the pulp may exercise its flotative power, and separating the floating material from this body of liquid.

14. A process of concentrating ores which consists in mixing the ore with water to form a flowing pulp, flowing the pulp into a closed vessel and subjecting it therein to violent agitation in the presence of a gas, flowing the agitated pulp away from the place of agitation and directly into a body of liquid with continuation of the inclosure thereof until the pulp is delivered into the body of liquid and restriction of the flow thereof, the pulp being delivered into the body of liquid below the liquid level and the body of liquid being in a substantially quiescent condition so that the gas in the pulp may exercise its flotative power, and separating the floating material from the body of liquid.

15. An apparatus for concentrating ores comprising, in combination, a mixer, a centrifugal pump having its inlet in communication with the mixer, a throttle valve for restricting the discharge outlet of the pump, means for introducing a flotation-producing substance into the mixture to be acted upon by the pump, means for introducing steam and air into the mixture to be acted upon by the pump, and a separator communicating with the outlet of the pump.

In witness whereof, I have hereunto signed my name in the presence of two witnesses.

LESLIE BRADFORD.

Witnesses:
  LEONARD W. BAKEWELL,
  J. B. JOHNSTON.